G. W. BROWN.
Corn-Planter.
No. 1,039. Reissued Sept. 11, 1860.
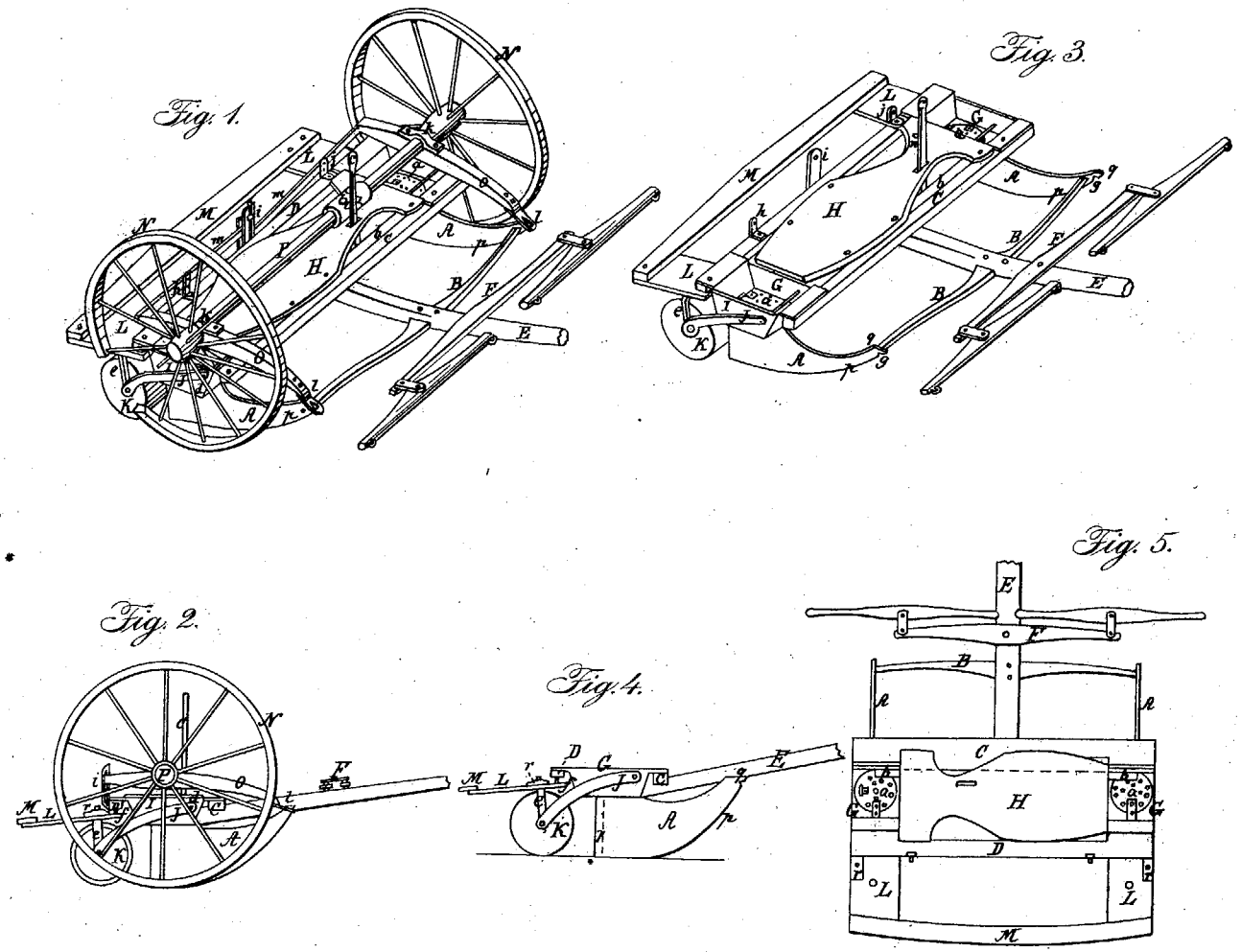
Witnesses:
E. Cohen
J. Hirsch,
Inventor:
George W. Brown.
By atty
A. B. Stoughton
AM. PHOTO-LITHO. CO. N.Y. (OSBORNE'S PROCESS)

UNITED STATES PATENT OFFICE.

GEORGE W. BROWN, OF GALESBURG, ILLINOIS.

IMPROVEMENT IN SEED-PLANTERS.

Specification forming part of Letters Patent No. 9,893, dated February 2, 1853; Reissue No. 526, dated February 16, 1858; Reissue No. 1,039, dated September 11, 1860.

DIVISION D.

*To all whom it may concern:*

Be it known that I, GEORGE W. BROWN, of Galesburg, in the county of Knox and State of Illinois, have invented certain new and useful Improvements in Seed-Planters; and I do hereby declare the following to be a full, clear, and exact description of the construction and operation of the same, reference being had to the accompanying drawings, making a part of this specification, in which—

Figure 1 represents a perspective view of my seed-planting machine arranged for automatic or "machine dropping," as it is termed. Fig. 2 represents a side elevation of the same. Fig. 3 represents the same machine arranged for hand-dropping. Fig. 4 represents a side elevation, and Fig. 5 a top plan, of the machine as arranged for hand-dropping, as shown in Fig. 3.

Similar letters of reference, where they occur in the several figures, denote corresponding parts of the machine in all the drawings.

It has been customary in seed-planting machines in which the seed-slides were operated automatically from some of the moving parts of the machine to mount the driver or conductor upon the machine; and it has also been customary to have the man who operates the seed-slides (when operated by hand) walk along behind or with the machine. I of course lay no claim to these things. I have discovered, however, that to mount the operator of a hand-planting machine upon the machine itself, where he can see the previously-made marks upon the ground and work his seed-slides so as to drop the charge or charges of seed in exact conformity thereto, not only relieves him of much of his onorous duty, but enables him to do better work and plant with more regularity, regular planting—that is, planting in straight rows or hills—making the cultivation of the young plants by machines much more certain and easy, and without throwing out or covering up such plants as would be outside of a regular line.

The nature of this part of my invention consists in so constructing a seed-planting machine, wherein the seed-dropping mechanism is operated by hand, in contradistinction from "mechanical or machine dropping," the so mounting of the operator upon said machine, as that he may readily and distinctly see the previously-made marks upon the ground, and operate the dropping mechanism to conform thereto; and my invention further consists in combining with a seed-planting machine composed substantially of frame-work, and upon which the person who works the seed slides or valves by hand sits or stands, a lever or its equivalent by which the driver who manages the team may raise or lower that part of the frame that carries the operator of the seeding apparatus, and thus ease the machine in passing any intervening obstacles or in turning it around.

To enable others skilled in the art to make and use this invention, I will proceed to describe the same with reference to the drawings.

H represents a seat or stand which is occupied by the person who works the seed slides or valves. This seat is supported upon the frame-work of the machine, and is so placed that the occupant of it can readily see the seed-dropping mechanism, as also the previously-made marks upon the ground, which guide him in his operations. The operator holds in his hand a lever, *c*, which is connected with the seed slides or valves, and he when sees that the hoppers or seed-ducts are in the line of the previously-made marks or rows he moves his lever and causes a charge of seed to fall from the hopper or tubes, into the furrow or gash made by the furrow-opener.

I found my invention upon the assumption that corn upon mucky or prairie soils cannot be planted with regularity by machinery—that is, dropped automatically—for the slipping of the wheels, and the clogging and choking of such parts as are used in connection with corn-dropping machines, cause so much irregularity as to make the after cultivation of the plants by machinery almost, if not entirely, impossible without great loss by throwing out or covering up the plants. I drop the seeds by hand through proper mechanism; and that the operator may readily see his work, and not guess at it, I place him on the machine, where he rides; and I believe I am the first to mount the man who plants by hand on the machine that prepares the furrow, carries the seed, and covers it up, everything being mechanical except simply the dropping of the seed. I do everything that can be well and properly done by machinery by such mechanical devices as are herein shown. The planting, or, rather, dropping fo the seed, which I allege cannot be properly done by machinery, I do by hand, and by the hand of a person who rides upon the machine.

In the drawings I have shown an entire seeding-machine, to which the operator's seat or stand, and the lever by which he operates the seed-slides, are affixed. From these drawings and positions the whole thing will be readily understood, and the application of them made. In a machine, however, upon which the person who operates the seed-slides rides, it is essential that some provision be made for easing the machine over intervening obstacles, and in turning around. For this purpose I connect with the frame-work B, C, D, &c., a second frame-work, J *e* L M. The seed-slide operator may ride on the first-named frame-work, and the second attendant or driver, by pressing down upon the cross-bar M, can raise up the other part, with the attendant upon it, and thus ease the runners. These two frame-works, or, rather, parts of frame-work, constitute the main frame, which is supported by the runners A and wheels K, and sometimes partially supported upon the tongue, which, being rigid on the frame B C D, may itself be called a part of that frame, while it also does the duty of tongues ordinarily. The weight of the person who works the seed-slides is important at times to hold the furrow-openers to or in the ground, and when his weight becomes a bar or preventative to the machine's other duties--viz., of mounting over obstructions, or in turning around—I have provided a means, as above described, of counteracting his weight by throwing a portion of it upon the wheels and tongue and suspending the seeding mechanism to them, or, in other words, removing the weight from the runners and its frame (except the tongue) and throwing it upon the wheels and tongue, thus putting the work, as well as the control of the machine, entirely under the supervision and direction of the attendants, and leaving nothing that requires judgment and skill to the machine itself.

Having thus fully described the nature and object of my invention, what I claim under this patent is—

1. In a seed-planting machine wherein the seed-dropping mechanism is operated by hand or by an attendant in contradistinction from mechanical dropping, the mounting of said attendant upon the machine in such position that he may readily see the previously-made marks upon the ground and operate the dropping mechanism to conform thereto, substantially as herein set forth 2. In combination with a seed-planting machine composed substantially of frame-work, and upon which the person who works the seed slides or valves sits or stands, a lever or its equivalent by which a driver or second attendant may raise or lower that part of the frame-work that carries the attendant and the seeding devices, and thus ease the machine in passing over intervening obstacles or in turning around, substantially as described.

GEO. W. BROWN.

Witnesses:

A. B. STOUGHTON,

E. COHEN.